(12) United States Patent  (10) Patent No.: US 8,975,522 B2
Shanai et al.  (45) Date of Patent: *Mar. 10, 2015

(54) ADHESIVE FILM AND FLAT CABLE USING SAME

(75) Inventors: Daisuke Shanai, Hitachi (JP); Tomiya Abe, Hitachi (JP)

(73) Assignee: Hitachi Metals, Ltd., Tokyo (JP)

(*) Notice: Subject to any disclaimer, the term of this patent is extended or adjusted under 35 U.S.C. 154(b) by 355 days.

This patent is subject to a terminal disclaimer.

(21) Appl. No.: 13/423,619

(22) Filed: Mar. 19, 2012

(65) Prior Publication Data

US 2012/0255761 A1  Oct. 11, 2012

(30) Foreign Application Priority Data

Apr. 7, 2011 (JP) ................................. 2011-085516
Nov. 1, 2011 (JP) ................................. 2011-240476

(51) Int. Cl.
  H01B 7/08 (2006.01)
  C09J 177/08 (2006.01)
  H01B 7/295 (2006.01)
(52) U.S. Cl.
  CPC ............... *C09J 177/08* (2013.01); *H01B 7/295* (2013.01)
  USPC ...................................................... 174/117 A
(58) Field of Classification Search
  CPC ....................................................... H01B 7/08
  USPC .......................................... 174/117 F, 117 A
  See application file for complete search history.

(56) References Cited

U.S. PATENT DOCUMENTS

| | | | |
|---|---|---|---|
| 6,333,095 B1 * | 12/2001 | Ueno et al. ................ | 428/212 |
| 7,091,422 B1 * | 8/2006 | Stotz ......................... | 174/117 F |
| 8,022,170 B2 * | 9/2011 | Hoffmann et al. ......... | 528/310 |
| 2001/0038915 A1 * | 11/2001 | Tamura et al. ............. | 428/375 |
| 2002/0195266 A1 * | 12/2002 | Yosomiya .................. | 174/117 F |
| 2008/0241529 A1 * | 10/2008 | Bauer et al. ............... | 428/355 R |
| 2013/0043058 A1 * | 2/2013 | Shanai ....................... | 174/126.4 |

FOREIGN PATENT DOCUMENTS

| | | |
|---|---|---|
| JP | 2002-367458 A1 | 12/2002 |
| JP | 2004-031218 | 1/2004 |
| JP | 2008-056820 | 3/2008 |
| JP | 2010-184952 | 8/2010 |

OTHER PUBLICATIONS

Japanese Office Action dated Aug. 26, 2014 and English translation of the notification of reasons for refusal.

* cited by examiner

*Primary Examiner* — Chau N Nguyen
(74) *Attorney, Agent, or Firm* — Roberts Mlotkowski Safran & Cole P.C.

(57) ABSTRACT

The adhesive film includes an insulating film, an adhesive layer provided over one side of the insulating film, and an anchor coat layer provided between the one side of the insulating film and the adhesive layer. The adhesive layer is a copolymer polyamide resin which is soluble in a solvent at 25 degrees Celsius and has a melting point of 100 degrees Celsius or more and 150 degrees Celsius or less. The anchor coat layer enhances the adhesion between the insulating film and the adhesive layer.

10 Claims, 2 Drawing Sheets

ADHESIVE FILM AND FLAT CABLE USING SAME

The present application is based on Japanese patent application No. 2011-85516 filed on Apr. 7, 2011 and Japanese patent application No. 2011-240476 filed on Nov. 1, 2011, the entire contents of which are incorporated herein by reference.

BACKGROUND OF THE INVENTION

1. Field of the Invention

This invention relates to an adhesive film and a flat cable using the adhesive film.

2. Description of the Related Art

Flat cables generally refer to cables with a plurality of parallel arranged rectangular conductors sandwiched between two films each having an adhesive layer (herein referred to as "adhesive films"), and are thin in thickness and feature an excellent flexibility. These flat cables have, because of their advantageous flexibility feature, been being widely used as internal wiring cables for various electric and electronic equipment, such as office automation equipment of printers, scanners, etc., computer equipment, video equipment of flat televisions, etc., audio equipment, robots, ultrasonic diagnostic equipment, and the like. Further, in recent years, because of increasing use of electronics in automobiles, the flat cables have become widespread for use on vehicles as well.

To use the flat cables as the internal wiring materials for electronic equipment among others, the flat cables must satisfy UL (Underwriters Laboratories Inc.) standards, and are required to have a high flame retardancy. A solution to this has been to make the adhesive films covering the conductors of the flat cables flame retardant. The adhesive films covering the conductors of the flat cables have been produced by, in many cases, applying a wet coat of adhesive dissolved in a solvent to an insulating film base material to form an adhesive layer.

The insulating film has used an engineering plastic film which is excellent in heat resistance and chemical resistance. Among other engineering plastic films, a polyethylene terephthalate (PET) film has generally been being used because of being widely commercially available in significant quantities, and excellent in cost and stability of supply. Incidentally, in order to enhance the adhesion between the PET film and the adhesive, the PET film is used by corona treating or ultraviolet treating its side to be coated with the adhesive.

There have been two methods to make the flat cables flame retardant, one by making the insulating film itself flame retardant, and the other by making the adhesive flame retardant.

As the method by making the insulating film itself flame retardant, there has been a method by using a film made of a self-extinguishing resin such as a polyimide resin. This self-extinguishing resin film has been very expensive however, and has been being used only for specific purposes. Therefore, a method by adding a flame retardant to the adhesive has generally been being employed.

As the base resin for forming the adhesive layer of the adhesive films, a thermoplastic polyester resin which provides an especially good adhesion to the polyethylene terephthalate film has been being widely used. As the thermoplastic polyester resins, there are amorphous and crystalline resins. The amorphous resin dissolves well in a versatile organic solvent, and therefore a wet coating thereof has been produced and has been being widely used as the resin for forming the adhesive layer of the general purpose flat cables. There has been the problem, however, that the amorphous resin is low in heat resistance, and therefore cannot be used for heat resistance.

Therefore, as a method by making the amorphous resin heat resistant, there has been a method by adding a curing agent to introduce a cross-link structure. This heat resistance enhancing method by introducing the amorphous polyester cross-link structure has been not likely to have a great effect in comparison to that by introducing the crystalline resin. Also, excessively introducing the cross-link structure is not likely to allow hot melting of the adhesive layer in flat cable production, and may therefore not result in a sufficient adhesive force of the adhesive layer.

On the other hand, the crystalline resin has a good heat resistance, and can be used as the resin for forming the adhesive layer of the flat cables used for heat resistance. However, the crystalline polyester resin tends to be insoluble in the solvent due to its crystallinity, and substantially does not dissolve in the versatile organic solvent. Therefore, there has been considered an adhesive layer forming method with a wet coating produced by dissolving the crystalline polyester resin in a chlorine based organic solvent with an especially high solvent power, such as a methylene chloride or the like. However, the chlorine based organic solvent may have a harmful effect on the human body and the environment, and its use therefore tends to be reduced.

Further, in order to use the crystalline polyester resin, there has also been considered a flat cable producing method by thin extrusion with an extruder.

Refer to JP-A-2002-367458, for example.

SUMMARY OF THE INVENTION

However, the flat cable producing method by thin extrusion disclosed by JP-A-2002-367458 above has required a massive facility, and tended to be high in production cost in comparison with that by wet coating. Further, when a large amount of the flame retardant has been contained in the base resin, the base resin has been high in melt viscosity, and therefore difficult to extrude thinly and uniformly.

Accordingly, it is an object of the present invention to provide an adhesive film, which uses no chlorine based organic solvent, but is capable of applying a wet coat of adhesive, and is excellent in heat resistance and flame retardancy, and which provides a good adhesion to another layer. It is also an object of the present invention to provide a flat cable using the adhesive film.

According to a feature of the invention, an adhesive film comprises:

an insulating film;

an adhesive layer provided over one side of the insulating film, the adhesive layer comprising a copolymer polyamide resin which is soluble in a solvent at 25 degrees Celsius and has a melting point of 100 degrees Celsius or more and 150 degrees Celsius or less; and an anchor coat layer provided between the one side of the insulating film and the adhesive layer, which enhances the adhesion between the insulating film and the adhesive layer.

The solvent for the adhesive layer may comprise a mixture of two solvents, and each of the two solvents has a boiling point of 120 degrees Celsius or less and is halogen free.

The solvent for the adhesive layer may comprise a solvent mixture of an aromatic organic solvent and an alcohol.

The adhesive layer may comprise a copolymer polyamide resin containing dimerized fatty acids with 20 to 48 carbon atoms in its molecule.

The adhesive layer contains 70 parts by weight or more and 200 parts by weight or less of at least one flame retardant of a bromine compound, a phosphorus compound, a nitrogen compound, and a metal compound, relative to 100 parts by weight of the resin.

The adhesive film may further comprise:
a conductor bonding layer provided over the adhesive layer, the conductor bonding layer being bondable with a metallic conductor,
wherein the adhesive layer contains 120 parts by weight or more and 200 parts by weight or less of at least one flame retardant of a bromine compound, a phosphorus compound, a nitrogen compound, and a metal compound, relative to 100 parts by weight of the resin.

The conductor bonding layer may comprise a resin which is soluble in a halogen free solvent and has a boiling point of 120 degrees Celsius or less.

The insulating film may comprise an engineering plastic film having a thickness of 9 µm or more and 100 µm or less.

According to another feature of the invention, a flat cable comprises:
a conductor; and
one pair of adhesive films, each including an insulating film, an adhesive layer provided over one side of the insulating film, the adhesive layer comprising a copolymer polyamide resin which is soluble in a solvent at 25 degrees Celsius and has a melting point of 100 degrees Celsius or more and 150 degrees Celsius or less, and an anchor coat layer formed between the one side of the insulating film and the adhesive layer which enhances the adhesion between the insulating film and the adhesive layer,
wherein the one pair of adhesive films are such arranged that respective adhesive layers of the one pair of adhesive films face each other, and the conductor is arranged between the one pair of adhesive layers, and the one pair of adhesive layers are bonded together to cover the conductor.

The solvent for the adhesive layer may comprise a mixture of two solvents, and each of the two solvents has a boiling point of 120 degrees Celsius or less and is halogen free.

The solvent for the adhesive layer may comprise a solvent mixture of an aromatic organic solvent and an alcohol.

The adhesive layer may comprise a copolymer polyamide resin containing dimerized fatty acids with 20 to 48 carbon atoms in its molecule.

The adhesive layer contains 70 parts by weight or more and 200 parts by weight or less of at least one flame retardant of a bromine compound, a phosphorus compound, a nitrogen compound, and a metal compound, relative to 100 parts by weight of the resin.

The flat cable may further comprise:
a conductor bonding layer provided over the adhesive layer, the conductor bonding layer being bondable with a metallic conductor,
wherein the adhesive layer contains 120 parts by weight or more and 200 parts by weight or less of at least one flame retardant of a bromine compound, a phosphorus compound, a nitrogen compound, and a metal compound, relative to 100 parts by weight of the resin.

The conductor bonding layer may comprise a resin which is soluble in a halogen free solvent and has a boiling point of 120 degrees Celsius or less.

The insulating film may comprise an engineering plastic film having a thickness of 9 µm or more and 100 µm or less.

(Points of the Invention)

The adhesive layer comprises the copolymer polyamide resin which is soluble in the solvent at room temperature (25 degrees Celsius) and its melting point is 100 degrees Celsius or more and 150 degrees Celsius or less. It is therefore possible to apply a wet coat of adhesive without using a chlorine based organic solvent, and provide an excellent heat resistance. The anchor coat layer is formed between the one side of the insulating film and the adhesive layer. It is therefore possible to enhance the adhesion between the insulating film and the adhesive layer.

It is also possible to provide a flat cable using the above specified adhesive film.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS (Summary of the Embodiments)

An adhesive film in embodiments according to the invention includes an insulating film, an adhesive layer formed over one side of the insulating film, and an anchor coat layer formed between the one side of the insulating film and the adhesive layer to enhance the adhesion between the insulating film and the adhesive layer. The adhesive layer is constructed of a copolymer polyamide resin which is soluble in a solvent at room temperature (25 degrees Celsius), and whose melting point is not lower than 100 degrees Celsius and not higher than 150 degrees Celsius.

The base resin for forming the above specified adhesive layer is required to have the following properties: Its melting point is not lower than 100 degrees Celsius and not higher than 150 degrees Celsius, and it is soluble in a versatile organic solvent other than chlorine based organic solvents, and it provides a sufficient adhesive force to the insulating film and to a metal conductor.

If the melting point of the base resin for forming the above specified adhesive layer is lower than 100 degrees Celsius, no sufficient heat resistance is obtained. Also, if the melting point of the base resin for forming the above specified adhesive layer exceeds 150 degrees Celsius, hot melting of the adhesive layer is not likely to occur in flat cable production, and therefore no sufficient adhesive force of the adhesive layer may be obtained. Since the copolymer polyamide resin used for the above specified adhesive layer is soluble in the versatile organic solvent, it is possible to wet coat the insulating film with the copolymer polyamide resin, even without using a chlorine based organic solvent.

As a result of diligent researching, the inventors have found that some crystalline copolymer polyamide based resins are soluble in a solvent mixture of toluene and an alcohol or a solvent mixture of methyl cyclohexane and n-propyl alcohol at room temperature (25 degrees Celsius), and have a suitable heat resistance. Based on these findings, the inventors have arrived at the invention.

Below are described embodiments according to the invention, with reference to the accompanying drawings. Incidentally, throughout all the Figures, elements having a substantially same function are provided with same reference numerals, but overlapping descriptions thereof are omitted.

(First Embodiment)

(Adhesive Film 5 Structure)

Figure 1:
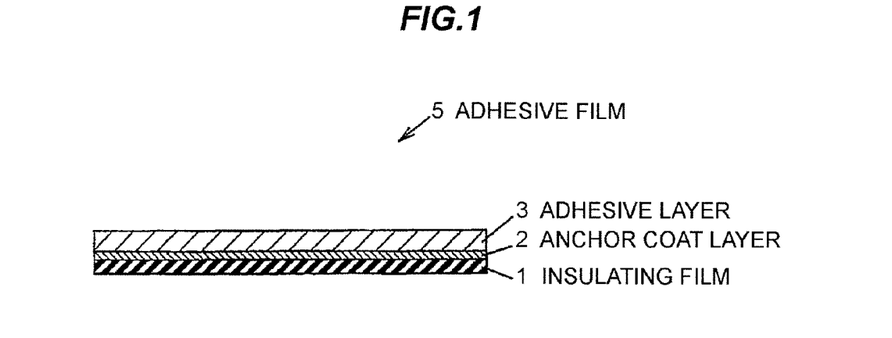
FIG. 1 is a cross sectional view showing one example of a structure of an adhesive film in a first embodiment according to the invention.

Referring to FIG. 1, there is shown a cross sectional view showing one example of a structure of an adhesive film 5 in a first embodiment according to the invention. As shown in FIG. 1, this adhesive film 5 includes an insulating film 1, an anchor coat layer 2 formed over one side of the insulating film 1, and an adhesive layer 3 formed over the anchor coat layer 2.

(Insulating Film 1)

As the suitable insulating film 1, an engineering plastic is used. For example, there can be used a polyester resin, aromatic polycarbonate resin, polyphenylene sulfide resin, polyimide resin, polyetherimide resin, or the like. As examples of the polyester resin, there are listed the following: polyethylene terephthalate resin, polybutylene terephthalate resin, polyethylene naphthalate resin, polybutylene naphthalate resin, polytrimethylene terephthalate resin, polytrimethylene naphthalate resin, polycyclohexane dimethyl terephthalate resin, polycyclohexane dimethyl naphthalate resin, polyarylate resin, and the like. Of these resins, the polyethylene terephthalate resin is preferred because of being excellent in heat resistance and chemical resistance, widely commercially available in significant quantities, and excellent in cost and stability of supply.

It is preferred that the thickness of the insulating film 1 is not less than 9 μm and not more than 100 μm. This is because if the insulating film 1 is thinner than 9 μm, then it is insufficient in strength, while if the insulating film 1 is thicker than 100 μm, then it lacks softness. Also, the material and layer thickness of the insulating film 1 may appropriately be determined within the above specified ranges, respectively, according to an application of a flat cable using the adhesive film 5 according to the invention. For example, for an application of the flat cable to electronic equipment such as printers, copiers and the like, giving great importance to repeated flexibility of the flat cable, the polyethylene terephthalate resin among other engineering plastics may be used. Also, in the application of the flat cable to the electronic equipment such as printers, copiers and the like, giving great importance to softness of the insulating film 1, and also requiring low breakdown voltage of the insulating film 1, it is preferred that the insulating film 1 is formed to be not too thick, i.e. its layer thickness is set at not less than 9 μm and not more than 35 μm. Further, for an application of the flat cable to equipment on vehicles such as electrical components and the like, requiring heat resistance and oil resistance of the insulating film 1, the polyethylene terephthalate resin, polyethylene naphthalate resin, polyimide resin or the like can suitably be used. In the application of the flat cable to the equipment on vehicles requiring higher heat resistance and higher reliability of the insulating film 1 than in the application of the flat cable to the electronic equipment such as printers, copiers and the like, the insulating film 1 is required to be formed to be relatively thick, i.e. its thickness is preferred to be set at not less than 25 μm and not more than 100 μm.

(Anchor Coat Layer 2)

The anchor coat layer 2 is as thin as not more than 10 μm, and is formed between the insulating film 1 and the adhesive layer 3, so that it enhances the reliability of the adhesion therebetween. As a base resin for forming the anchor coat layer 2, there can be used a polyester based resin, polyether based resin, polyurethane based resin, polyamide based resin, epoxy based resin, or the like. When the material of the insulating film 1 uses the polyethylene terephthalate resin, the base resin for forming the anchor coat layer 2 is preferred to use the polyester based resin, or the polyurethane based resin which both is high in the adhesion to the polyethylene terephthalate resin.

Also, the anchor coat layer 2 can, if desired, be added with each kind of flame retardant, antioxidant, colorant, thickener, cross-linker, cross-linking aid, copper inhibitor, antistatic agent, ultraviolet absorber, light stabilizer, and antihydrolysis agent.

(Adhesive Layer 3)

The adhesive layer 3 is for bonding one pair of the adhesive films 5 together, and its base resin uses a copolymer polyamide resin containing polymerized fatty acids which is a crystalline resin soluble in a solvent at room temperature (25 degrees Celsius). It is preferred that the polymerized fatty acid containing copolymer polyamide resin is soluble in a solvent mixture of an aromatic organic solvent and an alcohol.

(Copolymer Polyamide Resin for the Adhesive Layer 3)

It is preferred that the melting point of the above specified copolymer polyamide resin is not lower than 100 degrees Celsius and not higher than 150 degrees Celsius. If the melting point of the above specified copolymer polyamide resin is lower than 100 degrees Celsius, then a problem arises with heat resistance. Also, if the melting point of the above specified copolymer polyamide resin is higher than 150 degrees Celsius, then the insulating film 1 may, when laminated therewith in flat cable production, deform due to being heated at a laminating temperature required to be higher than that melting point.

In this embodiment according to the invention, as the copolymer polyamide resin whose melting point is not lower than 100 degrees Celsius and not higher than 150 degrees Celsius, there may be used one containing dimerized fatty acids with 20 to 48 carbon atoms in its molecule. Among others, the copolymer polyamide resin containing dimerized fatty acids with 20 to 48 carbon atoms in its molecular structure is inhibited from crystallization because of randomly having noble structures in its molecule, and is therefore enhanced in solubility in the solvent.

In general, crystalline resins have an excellent heat resistance in a temperature range lower than their melting point. Further, the crystalline resins generally have the feature that they tend to be insoluble in a solvent due to a very high cohesion. For example, crystalline polyethylene, nylon (registered trademark), and polyester resins substantially do not dissolve in a halogen free solvent at room temperature (25 degrees Celsius).

(Solvent for the Adhesive Layer 3)

The copolymer polyamide resin used in this embodiment whose melting point is not lower than 100 degrees Celsius and not higher than 150 degrees Celsius is crystalline, but tends to dissolve in a particular solvent mixture whose boiling point is not higher than 120 degrees Celsius. Further, the solvent mixture is preferred to be halogen free. For example, the copolymer polyamide resin used in this embodiment has the feature that it dissolves in a solvent mixture of toluene and an alcohol such as methanol, ethanol, isopropyl alcohol, n-propyl alcohol or the like, and also dissolves in a solvent mixture of methyl cyclohexane and n-propyl alcohol. Incidentally, it substantially does not dissolve in toluene alone, or methyl cyclohexane alone, or an alcohol alone.

It is preferred that the mixing ratio of toluene and an alcohol is in a range of "toluene:alcohol=90:10 to 10:90." Also, it is preferred that the mixing ratio of methyl cyclohexane and n-propyl alcohol is in a range of "methyl cyclohexane:n-propyl alcohol=60:40 to 20:80."

(Flame Retardant Added to the Adhesive Layer 3)

The additive amount of a flame retardant added to the base resin of the adhesive layer 3 is not less than 50 parts by weight and not more than 250 parts by weight, relative to 100 parts by weight of the resin. If the additive amount of the flame retardant added to the base resin of the adhesive layer 3 is less than 50 parts by weight, then no sufficient flame retardancy can be obtained. Also, if the additive amount of the flame retardant added to the base resin of the adhesive layer 3 exceeds 250 parts by weight, no sufficient adhesive force of the adhesive layer 3 can be held. For that, it is more preferred that the additive amount of the flame retardant added to the base resin of the adhesive layer 3 is not less than 70 parts by weight and not more than 200 parts by weight, relative to 100 parts by weight of the resin.

Also, as the flame retardant added to the base resin of the adhesive layer 3, there can be used any of a bromine compound, phosphorus compound, nitrogen compound, and metal compound. These compounds may be used alone, or two or more compounds thereof may be used together.

Incidentally, as the bromine compound, ethylenebis(pentabromophenyl) can be used. Also, the phosphorus based compound can use a metallic phosphate, phosphate, melamine polyphosphate, ammonium polyphosphate, phosphate ester, condensed phosphate ester, or phosphazene compound. Also, the nitrogen based flame retardant can use a melamine sulfate, guanidine compound, melamine compound, or 1,3,5-triazine derivative. Also, the metal compound can use a magnesium hydroxide, aluminum hydroxide, zinc stannate, zinc hydroxystannate, zinc borate, calcium borate, zinc sulfide, or antimony trioxide.

The adhesive layer 3 can be added with an antioxidant, copper inhibitor, antiblocking agent, colorant, thickener, cross-linker, cross-linking aid, antistatic agent, ultraviolet absorber, light stabilizer, and antihydrolysis agent. Because environmental load reduction has been required in recent years, it is preferred to use the halogen free and antimony free flame retardant, if possible.

(Second Embodiment)

(Structure of Adhesive Film 6)

Figure 2:
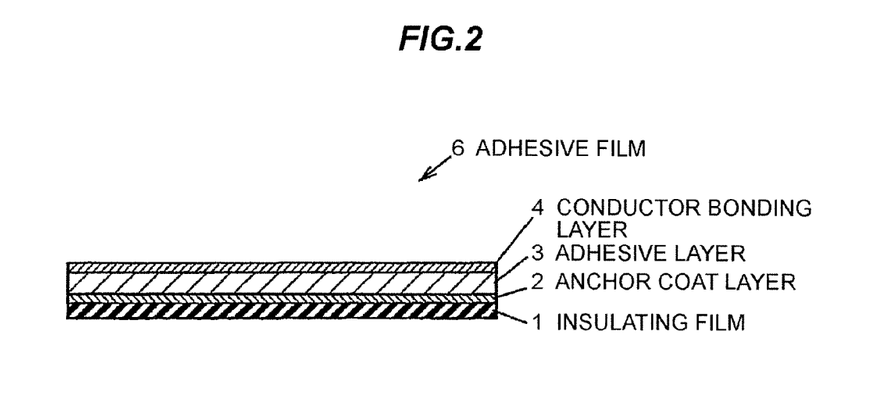
FIG. 2 is a cross sectional view showing one example of a structure of an adhesive film in a second embodiment according to the invention.

Referring to FIG. 2, there is shown a cross sectional view showing one example of an adhesive film 6 in a second embodiment according to the invention. This adhesive film 6 includes the insulating film 1, the anchor coat layer 2 and the adhesive layer 3 which constitute the adhesive film 5 as shown in FIG. 1, and a further conductor bonding layer 4 formed over the adhesive layer 3 of the adhesive film 5, and the conductor bonding layer 4 is bondable with a metal conductor.

Although the adhesive layer 3 is constructed in the same manner as in the first embodiment, the additive amount of the flame retardant added to the adhesive layer 3, when provided with the conductor bonding layer 4 thereover, is not less than 120 parts by weight and not more than 200 parts by weight, relative to 100 parts by weight of the resin.

(Conductor Bonding Layer 4)

A base resin for constituting the conductor bonding layer 4 can use a resin which is soluble in a halogen free solvent whose boiling point is not higher than 120 degrees Celsius. The reason for the boiling point of the solvent being not higher than 120 degrees Celsius is because if the boiling point of the solvent is higher than 120 degrees Celsius, then the underlying adhesive layer 3 may, when dried after being coated with the bonding agent layer 4, deform due to being heated at a drying temperature required to be not lower than that boiling point, and also for a long drying time in comparison with a solvent whose boiling point is low.

As the solvent whose boiling point is not higher than 120 degrees Celsius, there can be used any of toluene, cyclohexane, methyl cyclohexane, methyl ethyl ketone, acetone, ethyl acetate, n-propyl alcohol, isopropyl alcohol, methanol, and ethanol. These solvents may be used alone, or a mixture thereof may be used.

As the resin which is soluble in these solvents, there can be used a thermoplastic polyurethane resin, amorphous polyester resin, or amorphous copolymer polyamide resin. These resins provide a good adhesion to the metal conductors for constituting the conductors of the flat cable. Among the others, the amorphous polyester resin, which is excellent in solubility in the solvents, and which provides a good adhesion to the conductor, can especially suitably be used.

The conductor bonding layer 4 can be added with a flame retardant, antioxidant, copper inhibitor, antiblocking agent, colorant, thickener, cross-linker, cross-linking aid, antistatic agent, ultraviolet absorber, light stabilizer, and antihydrolysis agent.

(Third Embodiment)

(Structure of Flat Cable 8)

Figure 3:
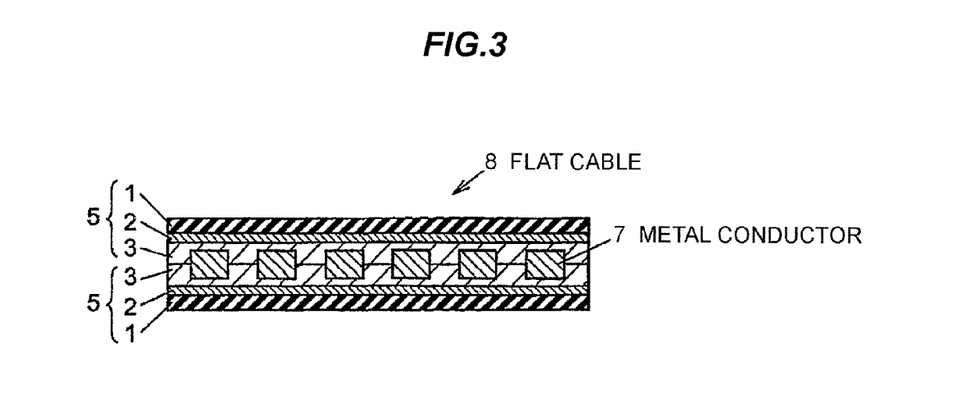
FIG. 3 is a cross sectional view showing one example of a structure of a flat cable in a third embodiment according to the invention.

Referring to FIG. 3, there is shown a cross sectional view showing one example of a structure of a flat cable 8 in a third embodiment according to the invention. This flat cable 8 is formed by use of the adhesive film 5 as shown in FIG. 1. That is, the flat cable 8 is formed by arranging the two adhesive films 5 so that their respective adhesive layers 3 face each other, arranging a plurality of metal conductors 7 parallel to each other between the adhesive layers 3, and thereafter bonding the adhesive layers 3 together with a laminator.

The metal conductors 7 can use an electrically conductive material, such as a copper based material made of a copper or a copper alloy, an iron based material made of an iron or an iron alloy, an aluminum based material made of aluminum or an aluminum alloy, or the like. As examples of the copper based material, there are listed the following: oxygen free copper, tough pitch copper, phosphor bronze and the like. Also, the metal conductors 7 may be plated with a metal such as Sn, Ni, or the like. The metal conductors 7 shown in FIG. 3 are those formed with a Sn plating film around surface of a core whose cross section shape is a rectangle having, for example, a thickness of not less than 20 µm and not more than 60 µm and a width of not less than 0.25 mm and not more than 1.3 mm, which is called a so called rectangular conductor. Incidentally, the Sn plating film may be added with at least one element selected from P, Ge, Ga, Zn, and Al. Also, the metal conductors 7 are not limited to the rectangular conductor, but can use a well known flat cable conductor.

The flat cable 8 in the third embodiment uses, as the base resin of the adhesive layers 3, the copolymer polyamide resin which is soluble in the solvent at room temperature (25 degrees Celsius) and whose melting point is not lower than 100 degrees Celsius and not higher than 150 degrees Celsius. It is therefore possible to apply a wet coat of adhesive without using a chlorine based organic solvent, and provide an excellent heat resistance.

(Fourth Embodiment)

(Structure of a Flat Cable 9)

Figure 4:
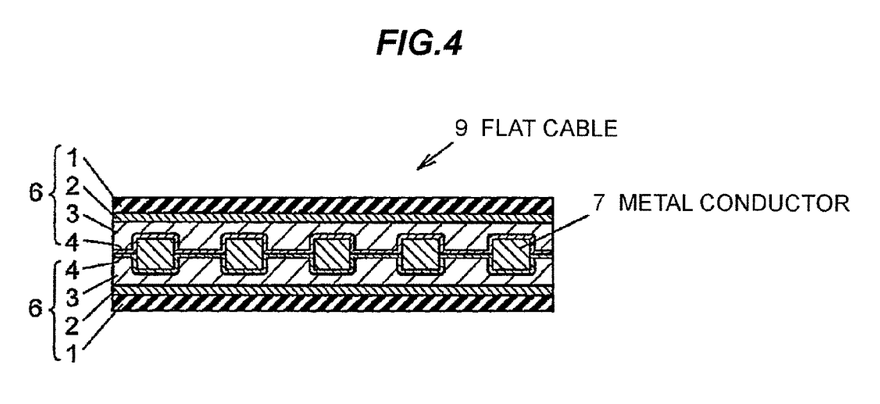
FIG. 4 is a cross sectional view showing one example of a structure of a flat cable in a fourth embodiment according to the invention.

Referring to FIG. 4, there is shown a cross sectional view showing one example of a structure of a flat cable 9 in a fourth embodiment according to the invention. This flat cable 9 is formed by use of the adhesive film 6 as shown in FIG. 2. That is, the flat cable 9 is formed by arranging the two adhesive films 6 so that their respective conductor bonding layers 4 face each other, arranging a plurality of metal conductors 7 parallel to each other between the conductor bonding layers 4, and thereafter bonding the conductor bonding layers 4 together with a laminator.

The flat cable 9 in the fourth embodiment uses the conductor bonding layers 4 which are excellent in adhesion to the metal conductors 7. Therefore, the flat cable 9 can, in addition to the advantage of the third embodiment, suppress the delamination between the insulating film 1 and the metal conductors 7, even when bent.

Examples 1 to 12 of the invention and Comparative examples 1 to 5 are described below. Examples 1 to 4, 9, and 10 correspond to the embodiments shown in FIGS. 1 and 3. Examples 5 to 8, 11, and 12 correspond to the embodiments shown in FIGS. 2 and 4. Comparative examples 1 to 5 correspond to the embodiments shown in FIGS. 1 and 3.

EXAMPLE 1

Referring to Table 1, there are shown compositions of coatings used for the anchor coat layer 2. Referring to Tables 2 and 3, there are shown compositions of adhesive coatings used for the adhesive layer 3. Referring to Table 4, there are shown compositions of adhesive coatings used for the conductor bonding layer 4. Referring to Tables 5 to 7, there are shown structures of Examples 1 to 12 and evaluation results thereof, while referring to Tables 8 and 9, there are shown structures of Comparative examples 1 to 5 and evaluation results thereof.

Incidentally, in Tables 2, 3, and 4, the solubility in a solvent is evaluated as "good" or "poor". The solubility is evaluated as "good" when the resin for forming the adhesive layer 3 dissolves in a solvent mixture, in any ratio, of toluene and an alcohol (methanol or ethanol or isopropyl alcohol or n-propyl alcohol), or of methyl cyclohexane and n-propyl alcohol, at a solid content concentration of 10 wt % at room temperature (25 degrees Celsius); and as "poor" when the resin for forming the adhesive layer 3 does not dissolve in the solvent mixture thereof at the solid content concentration of 10 wt % at room temperature (25 degrees Celsius).

Also, the heat resistance is evaluated as follows: First, after the adhesive used for the adhesive layer 3 is dissolved in the solvent, it is applied onto a smooth aluminum sheet as the adhesive coating and is dried, resulting in the 25 μm thick adhesive layer 3 being formed over the aluminum sheet. Then, a cylindrical aluminum bar whose tip is 3 mm in length and 1 mm in diameter is held on the adhesive layer 3, with a pressure load of 1 MPa applied from above, in an 85° C. constant temperature bath, for 24 hours. The heat resistance is accepted when no electrical connection occurs between the aluminum sheet and the aluminum bar after 24 hours, and is rejected otherwise.

First, a wet coating of composition A specified in Table 1 is applied by using a slot die coater onto a corona treated side of a 12 μm thick polyethylene terephthalate resin film (herein referred to as "polyethylene terephthalate film") used as the insulating film 1, and is dried. It results in the 2 μm thick anchor coat layer 2 being formed over the insulating film 1.

Next, an adhesive coating of composition 1 specified in Table 2 is applied by using a slot die coater onto the anchor coat layer 2, and is dried, resulting in the 27 μm thick adhesive layer 3 being formed over the anchor coat layer 2. This results in the adhesive film 5. The adhesive of composition 1 was good in both solubility in the solvent, and heat resistance.

Between the resultant adhesive films 5, fifty tin plated rectangular soft conductors, which are 0.3 mm wide and 35 μm thick, are arranged parallel at 0.5 pitch as the metal conductors 7, and are laminated, resulting in the flat cable 8. The adhesion and flame retardancy of the resulting flat cable 8 are evaluated.

The adhesion of the flat cable 8 is evaluated by 180 degree delamination testing of the terminal conductors 7 of the flat cable 8 at a peel rate of 50 mm/min. The adhesion is accepted when the peel strength is not less than 0.3 kN/m. Incidentally, the adhesion is evaluated as "fair" when the peel strength is not less than 0.3 kN/m and less than 0.4 kN/m; as "good" when the peel strength is not less than 0.4 kN/m and less than 0.6 kN/m; and as "excellent" when the peel strength is not less than 0.6 kN/m. The adhesion is rejected as "poor" when the peel strength is less than 0.3 kN/m.

The flame retardancy of the flat cable 8 is evaluated by vertical flame testing (UL758 VW-1) of the flat cable 8. The flame retardancy is accepted as "excellent" when all five of five test pieces are accepted; as "good" when four of the five test pieces are accepted; and as "fair" when two to three of the five test pieces are accepted. The flame retardancy is rejected as "poor" when one or none of the five test pieces is accepted. In Example 1, the adhesion was as "excellent" as 0.6 kN/m, and the flame retardancy was as "excellent" as all five of the five test pieces being accepted.

EXAMPLE 2

In Example 2, the polyethylene terephthalate film used is different in thickness from that used in Example 1, and is 25 μm in thickness. Also, in Example 2, the adhesive layer 3 formed is different in composition and thickness from that formed in Example 1. In Example 2, the adhesive layer 3 uses an adhesive coating of composition 2 specified in Table 2, and is 36 μm in thickness, and is formed in the same manner as in Example 1. This results in the adhesive film 5. The adhesive of composition 2 was good in both solubility in the solvent, and heat resistance.

Also, the flat cable 8 is produced in the same manner as in Example 1, and its adhesion and flame retardancy are evaluated in the same manner as in Example 1. In Example 2, the adhesion was as "good" as 0.4 kN/m, and the flame retardancy was as "excellent" as all five of the five test pieces being accepted.

EXAMPLE 3

In Example 3, the polyethylene terephthalate film is the same in thickness as that of Example 1, but the adhesive layer 3 is different in composition from that of Example 1. In Example 3, the adhesive layer 3 uses an adhesive coating of composition 3 specified in Table 2, and is 27 μm in thickness, and is formed in the same manner as in Example 1. This results in the adhesive film 5. The adhesive of composition 3 was good in both solubility in the solvent, and heat resistance.

Also, the flat cable 8 is produced in the same manner as in Example 1, and its adhesion and flame retardancy are evaluated in the same manner as in Example 1. In Example 3, the adhesion was as "excellent" as 0.6 kN/m, and the flame retardancy was accepted as "fair" as three of the five test pieces being accepted, though slightly poor due to the additive amount of the flame retardant added to the adhesive layer 3 being 50 parts by weight.

EXAMPLE 4

In Example 4, the polyethylene terephthalate film used is different in thickness from that used in Example 1, and is 25 μm in thickness. Also, in Example 4, the adhesive layer 3 formed is different in composition and thickness from that formed in Example 1. In Example 4, the adhesive layer 3 uses an adhesive coating of composition 4 specified in Table 2, and is 36 μm in thickness, and is formed in the same manner as in Example 1. This results in the adhesive film 5. The adhesive of composition 4 was good in both solubility in the solvent, and heat resistance.

Also, the flat cable 8 is produced in the same manner as in Example 1, and its adhesion and flame retardancy are evaluated in the same manner as in Example 1. In Example 4, the adhesion was as fair as 0.3 kN/m though slightly low due to 250 parts by weight of the flame retardant being contained in the adhesive layer 3, and the flame retardancy was as "excellent" as all five of the five test pieces being accepted.

EXAMPLE 5

First, as with Example 1, a wet coating of composition A specified in Table 1 is applied with a slot die coater onto a corona treated side of a 12 μm thick polyethylene terephthalate film used as the insulating film 1, and is dried. It results in the 2 μm thick anchor coat layer 2 being formed over the insulating film 1.

Next, a wet adhesive coating of composition 5 specified in Table 2 is applied with a slot die coater onto the anchor coat layer 2, and is dried, resulting in the 25 μm thick adhesive layer 3 being formed over the anchor coat layer 2.

Further, a wet adhesive coating of composition C specified in Table 4 is applied with a slot die coater onto the adhesive layer 3, and is dried, resulting in the 4 μm thick conductor bonding layer 4 being formed over the adhesive layer 3. This results in the adhesive film 6. The adhesive of composition 5 was good in both solubility in the solvent, and heat resistance.

Between the resultant adhesive films 6, fifty tin plated rectangular soft conductors, which are 0.3 mm wide and 35 μm thick, are arranged parallel at 0.5 pitch as the metal conductors 7, and are laminated, resulting in the flat cable 9.

The adhesion and flame retardancy of the resulting flat cable 9 are evaluated in the same conditions as in Example 1. In Example 5, the adhesion was as "excellent" as 1.0 kN/m, and the flame retardancy was as "excellent" as all five of the five test pieces being accepted.

EXAMPLE 6

In Example 6, the polyethylene terephthalate film is the same in thickness as that of Example 5, but the adhesive layer 3 is different in composition and thickness from that formed in Example 5. In Example 6, the adhesive layer 3 uses an adhesive coating of composition 6 specified in Table 2, and is 35 μm in thickness, and is formed in the same manner as in Example 5.

Also, in Example 6, the conductor bonding layer 4 formed is different in composition from that formed in Example 5. In Example 6, the conductor bonding layer 4 uses an adhesive coating of composition D specified in Table 4, and is 4 μm in thickness, and is formed in the same manner as in Example 5. This results in the adhesive film 6. The adhesive of composition 6 was good in both solubility in the solvent, and heat resistance.

Also, the flat cable 9 is produced in the same manner as in Example 5, and its adhesion and flame retardancy are evaluated in the same manner as in Example 5. In Example 6, the adhesion was as excellent as 1.1 kN/m, and the flame retardancy was as "excellent" as all five of the five test pieces being accepted.

EXAMPLE 7

In Example 7, the anchor coat layer 2 is different in composition from that of Example 5. In Example 7, a coating of composition B specified in Table 1 is applied with a slot die coater onto a corona treated side of a 12 μm thick polyethylene terephthalate film used as the insulating film 1, and is dried. It results in the 2 μm thick anchor coat layer 2 being formed over the insulating film 1.

Also, in Example 7, the adhesive layer 3 is different in composition from that of Example 5. In Example 7, the adhesive layer 3 uses an adhesive coating of composition 7 specified in Table 2, and is 25 μm in thickness, and is formed in the same manner as in Example 5.

Also, in Example 7, the conductor bonding layer 4 formed is different in composition from that formed in Example 5. In Example 7, the conductor bonding layer 4 uses an adhesive coating of composition E specified in Table 4, and is 4 μm in thickness, and is formed in the same manner as in Example 5. This results in the adhesive film 6. The adhesive of composition 7 was good in both solubility in the solvent, and heat resistance.

Also, the flat cable 9 is produced in the same manner as in Example 5, and its adhesion and flame retardancy are evaluated in the same manner as in Example 5. In Example 7, the adhesion was as "excellent" as 0.8 kN/m, and the flame retardancy was as "good" as four of the five test pieces being accepted.

EXAMPLE 8

In Example 8, the polyethylene terephthalate film used is different in thickness from that used in Example 5, and is 25 μm in thickness. Also, in Example 8, the adhesive layer 3 formed is different in composition and thickness from that formed in Example 5. In Example 8, the adhesive layer 3 uses an adhesive coating of composition 8 specified in Table 2, and is 35 μm in thickness, and is formed in the same manner as in Example 5.

Also, in Example 8, the conductor bonding layer 4 formed is different in composition from that formed in Example 5. In Example 8, the conductor bonding layer 4 uses an adhesive coating of composition F specified in Table 4, and is 4 μm in thickness, and is formed in the same manner as in Example 5. This results in the adhesive film 6. The adhesive of composition 8 was good in both solubility in the solvent, and heat resistance.

Also, the flat cable 9 is produced in the same manner as in Example 5, and its adhesion and flame retardancy are evaluated in the same manner as in Example 5. In Example 8, the adhesion was as "good" as 0.5 kN/m, and the flame retardancy was as "excellent" as all five of the five test pieces being accepted.

EXAMPLE 9

In Example 9, the polyethylene terephthalate film is the same in thickness as that of Example 1, but the adhesive layer 3 is different in composition and thickness from that of Example 1. In Example 9, the adhesive layer 3 uses an adhesive coating of composition 9 specified in Table 2, and is 27 μm in thickness, and is formed in the same manner as in Example 1. This results in the adhesive film 5. The adhesive of composition 9 was good in both solubility in the solvent, and heat resistance.

Also, the flat cable 9 is produced in the same manner as in Example 1, and its adhesion and flame retardancy are evaluated in the same manner as in Example 1. In Example 9, the adhesion was as "good" as 0.5 kN/m, and the flame retardancy was as "excellent" as all five of the five test pieces being accepted.

EXAMPLE 10

In Example 10, the polyethylene terephthalate film used is different in thickness from that used in Example 1, and is 25 μm in thickness. Also, in Example 10, the adhesive layer 3 formed is different in composition and thickness from that formed in Example 1. In Example 10, the adhesive layer 3 uses an adhesive coating of composition 10 specified in Table 2, and is 36 μm in thickness, and is formed in the same manner as in Example 1. This results in the adhesive film 5. The adhesive of composition 10 was good in both solubility in the solvent, and heat resistance.

Also, the flat cable 8 is produced in the same manner as in Example 1, and its adhesion and flame retardancy are evaluated in the same manner as in Example 1. In Example 10, the adhesion was as "good" as 0.5 kN/m, and the flame retardancy was as "excellent" as all five of the five, test pieces being accepted.

EXAMPLE 11

In Example 11, the adhesive layer 3 is different in composition from that of Example 5. In Example 11, the adhesive layer 3 uses an adhesive coating of composition 11 specified in Table 2, and is 25 μm in thickness, and is formed in the same manner as in Example 5.

Also, in Example 11, the conductor bonding layer 4 formed is different in composition from that formed in Example 5. In Example 11, the conductor bonding layer 4 uses an adhesive coating of composition C specified in Table 4, and is 4 μm in thickness, and is formed in the same manner as in Example 5. This results in the adhesive film 6. The adhesive of composition 11 was good in both solubility in the solvent, and heat resistance.

Also, the flat cable 9 is produced in the same manner as in Example 5, and its adhesion and flame retardancy are evaluated in the same manner as in Example 5. In Example 11, the adhesion was as "excellent" as 0.9 kN/m, and the flame retardancy was as "excellent" as all five of the five test pieces being accepted.

EXAMPLE 12

In Example 12, the polyethylene terephthalate film used is different in thickness from that used in Example 5, and is 25 μm in thickness. Also, in Example 12, the adhesive layer 3 formed is different in composition from that formed in Example 5. In Example 12, the adhesive layer 3 uses an adhesive coating of composition 12 specified in Table 2, and is 25 μm in thickness, and is formed in the same manner as in Example 5.

Also, in Example 12, the conductor bonding layer 4 formed is different in composition from that formed in Example 5. In Example 12, the conductor bonding layer 4 uses an adhesive coating of composition F specified in Table 4, and is 4 μm in thickness, and is formed in the same manner as in Example 5. This results in the adhesive film 6. The adhesive of composition 12 was good in both solubility in the solvent, and heat resistance.

Also, the flat cable 9 is produced in the same manner as in Example 5, and its adhesion and flame retardancy are evaluated in the same manner as in Example 5. In Example 12, the adhesion was as "excellent" as 1.0 kN/m, and the flame retardancy was as "excellent" as all five of the five test pieces being accepted.

COMPARATIVE EXAMPLE 1

In Comparative example 1, the polyethylene terephthalate film is the same in thickness as that of Example 1, but the adhesive layer 3 is different in material from that of Example 1. In Comparative example 1, the adhesive layer 3 uses an adhesive coating of composition 13 specified in Table 3, and is 27 μm in thickness, and is formed in the same manner as in Example 1. This results in the adhesive film 5. The adhesive of composition 13 was "good" in solubility in the solvent. But, the adhesive of composition 13 was "rejected" in heat resistance evaluation due to the melting point of the crystalline copolymer polyamide resin used for the adhesive of composition 13 being lower than 100 degrees Celsius.

Also, between the resulting adhesive films 5, fifty tin plated rectangular soft conductors, which are 0.3 mm wide and 35 μm thick, are arranged parallel at 0.5 pitch as the metal conductors 7, and are laminated, resulting in the flat cable 8.

Also, the adhesion and flame retardancy of the resulting flat cable 8 are evaluated in the same conditions as in Example 1. In Comparative example 1, the adhesion was accepted as "good" as 0.4 kN/m, but the flame retardancy was evaluated as "poor" as all five of the five test pieces being rejected due to no flame retardant being contained.

COMPARATIVE EXAMPLE 2

In Comparative example 2, the resin of composition 14 for the adhesive layer 3 is a crystalline copolymer polyamide resin whose melting point is 153 degrees Celsius, but is insoluble in the solvent. Its solubility in the solvent was therefore "poor". An adhesive coating of composition 14 failed to be produced, and the other evaluations therefore failed to be made ("Unevaluated").

COMPARATIVE EXAMPLE 3

In Comparative example 3, the polyethylene terephthalate film used is the same in thickness as that used in Example 1, and is 12 μm in thickness. Also, in Comparative example 3, the adhesive layer 3 formed is different in composition from that formed in Example 1

In Comparative example 3, the adhesive layer 3 uses an adhesive coating of composition 15 specified in Table 3, and is 27 μm in thickness, and is formed in the same manner as in Example 1.

The adhesive of composition 15 is an amorphous copolymer polyamide resin, and was therefore "good" in solubility in the solvent. But, the adhesive of composition 15 was "rejected" in heat resistance evaluation due to the amorphous resin.

Also, the flat cable 8 is produced in the same manner as in Comparative example 1, and its adhesion and flame retardancy are evaluated in the same manner as in Comparative example 1. In Comparative example 3, due to 300 parts by weight of the flame retardant being contained in the adhesive layer 3, no sufficient adhesive force was held, and the adhesion was rejected as "poor" as 0.1 kN/m, though the flame retardancy was evaluated as "excellent" as all five of the five test pieces being accepted.

COMPARATIVE EXAMPLE 4

In Comparative example 4, the resin of composition 16 for the adhesive layer 3 is a crystalline polyester resin, but is insoluble in the solvent. Its solubility in the solvent was therefore "poor". For that, an adhesive coating of composition 16 failed to be produced, and the other evaluations therefore failed to be made ("Unevaluated").

COMPARATIVE EXAMPLE 5

In Comparative example 5, the polyethylene terephthalate film is the same in thickness as that of Example 1, but the adhesive layer 3 is different in composition from that of Example 1. In Comparative example 5, the adhesive layer 3 uses an adhesive coating of composition 17 specified in Table 3, and is 27 μm in thickness, and is formed in the same manner as in Example 1.

The adhesive of composition 17 was "good" in solubility in the solvent. But, the adhesive of composition 17 was "rejected" in heat resistance evaluation due to the amorphous resin.

Also, the flat cable 8 is produced in the same manner as in Comparative example 1, and its adhesion and flame retardancy are evaluated in the same manner as in Comparative example 1. In Comparative example 5, the adhesion was rejected as "poor" as 0.1 kN/m, though the flame retardancy was evaluated as "good" as four of the five test pieces being accepted.

Incidentally, the invention is not limited to the above embodiments and the above examples, but various modifications may be made without departing from the spirit and scope of the invention.

The combination and laminated structure in the adhesive film 5 or 6 according to the invention can appropriately be determined within the above specified ranges, respectively, according to use environments and the like of applicable products, so that the adhesive film 5 or 6 can be applied to any product of flat cables used for the previously mentioned electronic equipment, equipment on vehicles, audio equipment and the like.

TABLE 1

| | Item | | | | Composition A | Composition B |
|---|---|---|---|---|---|---|
| Combination (part by wt) | Resin | Amorphous polyester | Elitel UE3220 Unitika Ltd. | No melting point | 100 | |
| | | Polyurethane | UR1350, Toyobo Co., Ltd. | No melting point | | 100 |
| | Curing agent | Isocyanate | Millionate MR-200, Nippon Polyurethane Co., Ltd. | — | 5 | |
| | | | MF-K60X, Asahi Chemical Industry Co., Ltd. | — | | 5 |
| | Solvent | Methyl ethyl ketone | Special grade chemical, Wako Pure Chemical Industries, Ltd. | Boiling point 80° C. | 380 | 1235 |
| | | Toluene | Special grade chemical, Wako Pure Chemical Industries, Ltd. | Boiling point 111° C. | 1520 | 665 |

TABLE 2

| | Item | | | | Composition | | | | | |
|---|---|---|---|---|---|---|---|---|---|---|
| | | | | | 1 | 2 | 3 | 4 | 5 | 6 |
| Combination (part by wt) | Resin | Crystalline copolymer polyamide | TPAE33, Fuji Chemical Industry Co., Ltd. | Melting point 106° C. | 100 | 100 | 100 | 100 | | |
| | | | TPAE31, Fuji Chemical Industry Co., Ltd. | Melting point 114° C. | | | | | | |
| | | | TPAE32, Fuji Chemical Industry Co., Ltd. | Melting point 124° C. | | | | | | |
| | | | PA102A, Fuji Chemical Industry Co., Ltd. | Melting point 148° C. | | | | | 100 | 100 |
| | Flame retardant | Bromine-based compound | SAYTEX8010, ALBEMARLE | — | | 70 | 200 | 50 | 250 | |
| | | Metal phosphate | Exolit OP935, Clariant | — | | | | | 120 | 200 |
| | | 1,3,5-triazine derivative | MC-5S, Sakai Chemical Industry Co., Ltd. | — | | | | | | |
| | | Calcium borate | UBP, KINSEI MATEC Co., Ltd. | — | | | | | | |
| | | Zinc stannate | ALCANEX ZS, Mizusawa Industrial Chemicals, Ltd. | — | | | | | | |
| | | Magnesium hydroxide | KISMA 5L, Kyowa Chemical Industry Co., Ltd. | — | | | | | | |
| | | Aluminum hydroxide | HIGILITE H42S, Showa Denko K.K. | — | | | | | | |
| | Additive | Titanium dioxide | R820, ISHIHARA SANGYO KAISHA, LTD. | — | | 20 | 20 | 20 | 20 | 20 | 20 |

TABLE 2-continued

|  |  |  |  |  |  |  |  |  |  |
|---|---|---|---|---|---|---|---|---|---|
|  | Solvent | Toluene | Special grade chemical, Wako Pure Chemical Industries, Ltd. | Boiling point 111° C. | 450 | 450 | 450 | 540 |  |  |
|  |  | Methyl cyclohexane | Special grade chemical, Wako Pure Chemical Industries, Ltd | Boiling point 101° C. |  |  |  |  | 270 | 450 |
|  |  | n-propyl alcohol | Special grade chemical, Wako Pure Chemical Industries, Ltd | Boiling point 97° C. |  |  |  |  | 630 | 450 |
|  |  | Isopropyl alcohol | Special grade chemical, Wako Pure Chemical Industries, Ltd | Boiling point 82° C. | 450 |  |  | 360 |  |  |
|  |  | Ethanol | Special grade chemical, Wako Pure Chemical Industries, Ltd | Boiling point 78° C. |  | 450 |  |  |  |  |
|  |  | Methanol | Special grade chemical, Wako Pure Chemical Industries, Ltd | Boiling point 65° C. |  |  | 450 |  |  |  |
| Evaluation result | Solubility in solvent Heat resistance | | Solubility in non-halogen based solvent No electrical connection between sheet & bar at 85° C. after 24 hours | | Good Accepted | Good Accepted | Good Accepted | Good Accepted | Good Accepted | Good Accepted |

|  |  |  |  |  | Composition | | | | | |
|---|---|---|---|---|---|---|---|---|---|---|
|  |  | Item |  |  | 7 | 8 | 9 | 10 | 11 | 12 |
| Combination (part by wt) | Resin | Crystalline copolymer polyamide | TPAE33, Fuji Chemical Industry Co., Ltd. | Melting point 106° C. |  |  |  |  |  |  |
|  |  |  | TPAE31, Fuji Chemical Industry Co., Ltd. | Melting point 114° C. |  |  |  | 100 | 100 |  |
|  |  |  | TPAE32, Fuji Chemical Industry Co., Ltd. | Melting point 124° C. |  |  |  |  | 100 | 100 |
|  |  |  | PA102A, Fuji Chemical Industry Co., Ltd. | Melting point 148° C. | 100 | 100 |  |  |  |  |
|  | Flame retardant | Bromine-based compound | SAYTEX8010, ALBEMARLE | — |  |  |  |  |  |  |
|  |  | Metal phosphate | Exolit OP935, Clariant | — |  |  | 135 | 135 | 135 | 135 |
|  |  | 1,3,5-triazine derivative | MC-5S, Sakai Chemical Industry Co., Ltd. | — | 100 | 250 |  |  |  |  |
|  |  | Calcium borate | UBP, KINSEI MATEC Co., Ltd. | — |  |  |  | 25 |  |  |
|  |  | Zinc stannate | ALCANEX ZS, Mizusawa Industrial Chemicals, Ltd. | — |  |  |  |  | 25 |  |
|  |  | Magnesium hydroxide | KISMA 5L, Kyowa Chemical Industry Co., Ltd. | — |  |  |  |  |  | 25 |
|  |  | Aluminum hydroxide | HIGILITE H42S, Showa Denko K. K. | — |  |  |  |  |  | 25 |
|  | Additive | Titanium dioxide | R820, ISHIHARA SANGYO KAISHA, LTD. | — | 20 | 20 | 20 | 20 | 20 | 20 |
|  | Solvent | Toluene | Special grade chemical, Wako Pure Chemical Industries, Ltd. | Boiling point 111° C. | 450 | 450 | 720 | 630 |  | 450 |
|  |  | Methyl cyclohexane | Special grade chemical, Wako Pure Chemical Industries, Ltd | Boiling point 101° C. |  |  |  |  | 450 |  |
|  |  | n-propyl alcohol | Special grade chemical, Wako Pure Chemical Industries, Ltd | Boiling point 97° C. |  |  |  |  | 450 | 450 |
|  |  | Isopropyl alcohol | Special grade chemical, Wako Pure Chemical Industries, Ltd | Boiling point 82° C. |  |  |  | 180 | 270 |  |
|  |  | Ethanol | Special grade chemical, Wako Pure Chemical Industries, Ltd | Boiling point 78° C. | 450 |  |  |  |  |  |
|  |  | Methanol | Special grade chemical, Wako Pure Chemical Industries, Ltd | Boiling point 65° C. |  |  | 450 |  |  |  |
| Evaluation result | Solubility in solvent Heat resistance | | Solubility in non-halogen based solvent No electrical connection between sheet & bar at 85° C. after 24 hours | | Good Accepted | Good Accepted | Good Accepted | Good Accepted | Good Accepted | Good Accepted |

TABLE 3

| | | | | | Composition | | | | |
|---|---|---|---|---|---|---|---|---|---|
| | | Item | | | 13 | 14 | 15 | 16 | 17 |
| Combination (part by wt) | Resin | Crystalline copolymer polyamide | PA100, Fuji Chemical Industry Co., Ltd. | Melting point 84° C. | 100 | | | | |
| | | | TPAE8, Fuji Chemical Industry Co., Ltd. | Melting point 153° C. | | | 100 | | |
| | | Amorphous copolymer polyamide | TPAE617, Fuji Chemical Industry Co., Ltd. | No melting point | | | | 100 | |
| | | Crystalline polyester | Vylon GM-443, Toyobo Co., Ltd. | Melting point 138° C. | | | | 100 | |
| | | Amorphous polyester | Vylon 200, Toyobo Co., Ltd. | No melting point | | | | | 100 |
| | Flame retardant | Metal phosphate | Exolit OP935, Clariant | — | | 0 | | | |
| | | Phosphate | FP2100J, ADEKA | — | | | 150 | | 150 |
| | | Melamine polyphosphate | Melapur 200/70, Ciba | — | | | | 300 | |
| | | Melamine sulfate | APINON-901, Sanwa Chemical Co., Ltd. | — | | | | 150 | |
| | Additive | Titanium dioxide | R820, ISHIHARA SANGYO KAISHA, LTD. | — | | 20 | 20 | 20 | 20 | 20 |
| | Solvent | Toluene | Special grade chemical, Wako Pure Chemical Industries, Ltd | Boiling point 111° C. | 450 | | 450 | 450 | 810 |
| | | Methyl cyclohexane | Special grade chemical, Wako Pure Chemical Industries, Ltd | Boiling point 101° C. | | 450 | | | |
| | | n-propyl alcohol | Special grade chemical, Wako Pure Chemical Industries, Ltd | Boiling point 97° C. | | | 450 | 450 | |
| | | Isopropyl alcohol | Special grade chemical, Wako Pure Chemical Industries, Ltd | Boiling point 82° C. | 450 | | 450 | | 90 |
| Evaluation result | Solubility in solvent | Solubility in non-halogen based solvent | | | Good | Poor | Good | Poor | Good |
| | Heat resistance | No electrical connection between sheet & bar at 85° C. after 24 hours | | | Rejected | Unevaluated | Rejected | Unevaluated | Rejected |

TABLE 4

| | | Item | | | Composition C | Composition D | Composition E | Composition F |
|---|---|---|---|---|---|---|---|---|
| Combination (part by wt) | Resin | Amorphous polyester | Vylon 670, Toyobo Co., Ltd. | No melting point | 70 | | | 70 |
| | | | Vylon 200, Toyobo Co., Ltd. | No melting point | 30 | | | 30 |
| | | Thermoplastic polyurethane | UR-1350, Toyobo Co., Ltd. | No melting point | | 100 | | |
| | | Copolymer polyamide | TPAE32, Fuji Chemical Industry Co., Ltd. | Melting point 124° C. | | | 100 | |
| | Flame retardant | Magnesium hydroxide | KISMA 5L, Kyowa Chemical Industry Co., Ltd. | — | | 50 | | |
| | | 1,3,5-triazine derivative | MC-5S, Sakai Chemical Industry Co., Ltd. | — | | | 50 | |
| | | Metal phosphate | Exolit OP935, Clariant | — | | | 50 | |
| | Solvent | Methyl ethyl ketone | Special grade chemical, Wako Pure Chemical Industries, Ltd. | — | | 600 | | 180 |
| | | Toluene | Special grade chemical, Wako Pure Chemical Industries, Ltd. | — | 900 | 300 | 270 | 720 |
| | | Isopropyl alcohol | Special grade chemical, Wako Pure Chemical Industries, Ltd. | — | | | 630 | |
| Evaluation result | Solubility in solvent | Solubility in solvent with not higher than 120° C. boiling point | | | Good | Good | Good | Good |

TABLE 5

|  |  |  | Example 1 | | Example 2 | | Example 3 | | Example 4 | |
| --- | --- | --- | --- | --- | --- | --- | --- | --- | --- | --- |
|  |  | Name | Material used | Film thickness | Material used | Film thickness | Material used | Film thickness | Material used | Film thickness |
| Construction (thickness: μm) | Conductor bonding layer | Table 4 composition | — | — | — | — | — | — | — | — |
|  | Adhesive layer | Table 2 composition | 1 | 27 | 2 | 36 | 3 | 27 | 4 | 36 |
|  |  | Flame retardant amount added | 70 |  | 200 |  | 50 |  | 250 |  |
|  | Anchor coat layer | Table 1 composition | A | 2 | A | 2 | A | 2 | A | 2 |
|  | Insulating film | Corona treated PET film |  | 12 |  | 25 |  | 12 |  | 25 |
| Evaluation result | Solubility in solvent |  | Good | | Good | | Good | | Good | |
|  | Heat resistance |  | Accepted | | Accepted | | Accepted | | Accepted | |
|  | Adhesion |  | Excellent | | Good | | Excellent | | Fair | |
|  | Flame retardancy |  | Excellent | | Excellent | | Fair | | Excellent | |

TABLE 6

|  |  |  | Example 5 | | Example 6 | | Example 7 | | Example 8 | |
| --- | --- | --- | --- | --- | --- | --- | --- | --- | --- | --- |
|  |  | Name | Material used | Film thickness | Material used | Film thickness | Material used | Film thickness | Material used | Film thickness |
| Construction (thickness: μm) | Conductor bonding layer | Table 4 composition | C | 4 | D | 4 | E | 4 | F | 4 |
|  | Adhesive layer | Table 2 composition | 5 | 25 | 6 | 35 | 7 | 25 | 8 | 35 |
|  |  | Flame retardant amount added | 120 |  | 200 |  | 100 |  | 250 |  |
|  | Anchor coat layer | Table 1 composition | A | 2 | A | 2 | B | 2 | B | 2 |
|  | Insulating film | Corona treated PET film |  | 12 |  | 25 |  | 12 |  | 25 |
| Evaluation result | Solubility in solvent |  | Good | | Good | | Good | | Good | |
|  | Heat resistance |  | Accepted | | Accepted | | Accepted | | Accepted | |
|  | Adhesion |  | Excellent | | Excellent | | Excellent | | Good | |
|  | Flame retardancy |  | Excellent | | Excellent | | Good | | Excellent | |

TABLE 7

|  |  |  | Example 9 | | Example 10 | | Example 11 | | Example 12 | |
| --- | --- | --- | --- | --- | --- | --- | --- | --- | --- | --- |
|  |  | Name | Material used | Film thickness | Material used | Film thickness | Material used | Film thickness | Material used | Film thickness |
| Construction (thickness: μm) | Conductor bonding layer | Table 4 composition | — | — | — | — | C | 4 | F | 4 |
|  | Adhesive layer | Table 2 composition | 9 | 27 | 10 | 36 | 11 | 25 | 12 | 35 |
|  |  | Flame retardant amount added | 160 |  | 160 |  | 160 |  | 160 |  |
|  | Anchor coat layer | Table 1 composition | B | 2 | B | 2 | B | 2 | B | 2 |
|  | Insulating film | Corona treated PET film |  | 12 |  | 25 |  | 12 |  | 25 |
| Evaluation result | Solubility in solvent |  | Good | | Good | | Good | | Good | |
|  | Heat resistance |  | Accepted | | Accepted | | Accepted | | Accepted | |
|  | Adhesion |  | Good | | Good | | Excellent | | Excellent | |
|  | Flame retardancy |  | Excellent | | Excellent | | Excellent | | Excellent | |

TABLE 8

|  |  |  | Comparative example 1 | | Comparative example 2 | | Comparative example 3 | | Comparative example 4 | |
| --- | --- | --- | --- | --- | --- | --- | --- | --- | --- | --- |
|  |  | Name | Material used | Film thickness | Material used | Film thickness | Material used | Film thickness | Material used | Film thickness |
| Construction (thickness: μm) | Conductor bonding layer | Table 4 composition | — | — | — | — | — | — | — | — |
|  | Adhesive layer | Table 3 composition | 13 | 27 | 14 | 36 | 15 | 27 | 16 | 25 |
|  |  | Flame retardant amount added | 0 |  | 150 |  | 300 |  | 150 |  |
|  | Anchor coat layer | Table 1 composition | A | 2 | A | 2 | A | 2 | B | 2 |
|  | Insulating film | Corona treated PET film |  | 12 |  | 25 |  | 12 |  | 25 |
| Evaluation result | Solubility in solvent |  | Good | | Poor | | Good | | Poor | |
|  | Heat resistance |  | Rejected | | Unevaluated | | Rejected | | Unevaluated | |
|  | Adhesion |  | Good | | Unevaluated | | Poor | | Unevaluated | |
|  | Flame retardancy |  | Poor | | Unevaluated | | Excellent | | Unevaluated | |

TABLE 9

|  |  |  | Comparative example 5 | |
| --- | --- | --- | --- | --- |
|  |  | Name | Material used | Film thickness |
| Construction (thickness: μm) | Conductor bonding layer | Table 4 composition | — | — |
|  | Adhesive layer | Table 3 composition | 17 | 27 |
|  |  | Flame retardant amount added | 150 |  |
|  | Anchor coat layer | Table 1 composition | B | 2 |
|  | Insulating film | Corona treated PET film |  | 12 |
| Evaluation result | Solubility in solvent |  | Good | |
|  | Heat resistance |  | Rejected | |
|  | Adhesion |  | Poor | |
|  | Flame retardancy |  | Good | |

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. An adhesive film, comprising:
   an insulating film;
   an anchor coat layer provided on one side of the insulating film,
   an adhesive layer having one side provided directly on the anchor coat and the adhesive layer comprising a copolymer polyamide resin which is soluble in a solvent at 25 degrees Celsius and has a melting point of 100 degrees Celsius or more and 150 degrees Celsius or less; and
   a conductor bonding layer provided on the other side of the adhesive layer, the conductor bonding layer being bondable with a metallic conductor,
   wherein the anchor coat layer enhances the adhesion between the insulating film and the adhesive layer, and
   wherein the adhesive layer contains 120 parts by weight or more and 200 parts by weight or less of at least one flame retardant of a bromine compound, a phosphorus compound, a nitrogen compound, and a metal compound, relative to 100 parts by weight of the resin, and
   wherein the solvent for the adhesive layer comprises a mixture of two solvents, and each of the two solvents comprises a halogen free solvent having a boiling point of 120 degrees Celsius or less.

2. The adhesive film according to claim 1, wherein the solvent for the adhesive layer comprises a solvent mixture of an aromatic organic solvent and an alcohol.

3. The adhesive film according to claim 1, wherein the adhesive layer comprises a copolymer polyamide resin containing dimerized fatty acids with 20 to 48 carbon atoms in its molecule.

4. The adhesive film according to claim 1, wherein the insulating film comprises an engineering plastic film having a thickness of 9 μm or more and 100 μm or less.

5. An adhesive film, comprising:
   an insulating film;
   an anchor coat layer provided on one side of the insulating film,
   an adhesive layer having one side provided directly on the anchor coat and the adhesive layer comprising a copolymer polyamide resin which is soluble in a solvent at 25 degrees Celsius and has a melting point of 100 degrees Celsius or more and 150 degrees Celsius or less; and
   a conductor bonding layer provided on the other side of the adhesive layer, the conductor bonding layer being bondable with a metallic conductor,
   wherein the anchor coat layer enhances the adhesion between the insulating film and the adhesive layer, and
   wherein the adhesive layer contains 120 parts by weight or more and 200 parts by weight or less of at least one flame retardant of a bromine compound, a phosphorus compound, a nitrogen compound, and a metal compound, relative to 100 parts by weight of the resin,
   wherein the conductor bonding layer comprises a resin which is soluble in a halogen free solvent having a boiling point of 120 degrees Celsius or less, and the halogen free solvent comprises one or more material selected from the group consisting of toluene, cyclohexane, methyl cyclohexane, methyl ethyl ketone, acetone, ethyl acetate, n-propyl alcohol, isopropyl alcohol, methanol, and ethanol.

6. A flat cable, comprising:
a conductor;
a pair of conductor bonding layers provided on both sides of the conductor, the conductor bonding layers being bondable with the conductor;
a pair of adhesive layers sandwiching the pair of conductor bonding layers;
a pair of anchor coat layers sandwiching the pair of adhesive layers; and
a pair of insulating films sandwiching the pair of anchor coat layers,
wherein the adhesive layers comprise a copolymer polyamide resin which is soluble in a solvent at 25 degrees Celsius and has a melting point of 100 degrees Celsius or more and 150 degrees Celsius or less
wherein each of the anchor coat layers enhances the adhesion between the insulating film and the adhesive layer,
wherein the adhesive layer contains 120 parts by weight or more and 200 parts by weight or less of at least one flame retardant of a bromine compound, a phosphorus compound, a nitrogen compound, and a metal compound, relative to 100 parts by weight of the resin, and
wherein the solvent for the adhesive layer comprises a mixture of two solvents, and each of the two solvents comprises a halogen free solvent having a boiling point of 120 degrees Celsius or less.

7. The flat cable according to claim 6, wherein the solvent for the adhesive layer comprises a solvent mixture of an aromatic organic solvent and an alcohol.

8. The flat cable according to claim 6, wherein the adhesive layer comprises a copolymer polyamide resin containing dimerized fatty acids with 20 to 48 carbon atoms in its molecule.

9. The flat cable according to claim 6, wherein the insulating film comprises an engineering plastic film having a thickness of 9 μm or more and 100 μm or less.

10. A flat cable, comprising:
a conductor;
a pair of conductor bonding layers provided on both sides of the conductor, the conductor bonding layers being bondable with the conductor;
a pair of adhesive layers sandwiching the pair of conductor bonding layers;
a pair of anchor coat layers sandwiching the pair of adhesive layers; and
a pair of insulating films sandwiching the pair of anchor coat layers,
wherein the adhesive layers comprise a copolymer polyamide resin which is soluble in a solvent at 25 degrees Celsius and has a melting point of 100 degrees Celsius or more and 150 degrees Celsius or less
wherein each of the anchor coat layers enhances the adhesion between the insulating film and the adhesive layer,
wherein the adhesive layer contains 120 parts by weight or more and 200 parts by weight or less of at least one flame retardant of a bromine compound, a phosphorus compound, a nitrogen compound, and a metal compound, relative to 100 parts by weight of the resin, and
wherein the conductor bonding layer comprises a resin which is soluble in a halogen free solvent having a boiling point of 120 degrees Celsius or less, and the halogen free solvent comprises one or more material selected from the group consisting of toluene, cyclohexane, methyl cyclohexane, methyl ethyl ketone, acetone, ethyl acetate, n-propyl alcohol, isopropyl alcohol, methanol, and ethanol.

* * * * *